(12) United States Patent
Groll et al.

(10) Patent No.: US 8,827,174 B2
(45) Date of Patent: Sep. 9, 2014

(54) SLEEPER FOR SUPPORTING RAILS

(75) Inventors: Peter Groll, Darmstadt (DE); Ralph Mueller, Darmstadt (DE); Martin Stillger, Brechen (DE)

(73) Assignee: Schenck Process GmbH, Darmstadt (DE)

( * ) Notice: Subject to any disclaimer, the term of this patent is extended or adjusted under 35 U.S.C. 154(b) by 0 days.

(21) Appl. No.: 13/592,014

(22) Filed: Aug. 22, 2012

(65) Prior Publication Data

US 2012/0325921 A1 Dec. 27, 2012

Related U.S. Application Data

(63) Continuation of application No. PCT/EP2011/000876, filed on Feb. 23, 2011.

(30) Foreign Application Priority Data

Mar. 1, 2010 (DE) .......................... 10 2010 009 754

(51) Int. Cl.
  *B61K 9/04* (2006.01)
  *G01J 5/04* (2006.01)
  *G01J 5/00* (2006.01)
  *G01J 5/08* (2006.01)

(52) U.S. Cl.
  CPC . *B61K 9/04* (2013.01); *G01J 5/041* (2013.01); *G01J 5/0022* (2013.01); *G01J 5/0809* (2013.01); *G01J 5/048* (2013.01); *G01J 5/0818* (2013.01)
  USPC ........................................... 238/85; 238/104

(58) Field of Classification Search
  USPC ....................................... 238/29, 84, 85, 104
  See application file for complete search history.

(56) References Cited

U.S. PATENT DOCUMENTS

| 1,495,288 | A | * | 5/1924 | Wilson | ............................. 238/78 |
| 3,062,450 | A | * | 11/1962 | Hanff | ............................. 238/287 |
| 5,397,900 | A | | 3/1995 | Wetzler | |
| 8,359,934 | B2 | * | 1/2013 | Ehmke et al. | ............ 73/862.041 |

FOREIGN PATENT DOCUMENTS

| DE | 1 176 697 | | 8/1964 | |
| DE | 42 17 681 A1 | | 12/1993 | |
| DE | 100 30 998 A1 | | 1/2002 | |
| DE | 100 60 380 A1 | | 6/2002 | |
| DE | 103 05 470 A1 | | 8/2004 | |
| DE | 10 2005 024 852 A1 | | 11/2006 | |
| DE | 10 2006 015 924 A1 | | 10/2007 | |
| DE | 102008018076 A1 | * | 10/2009 | .............. B61K 9/08 |
| EP | 1 772 342 A2 | | 4/2007 | |

* cited by examiner

*Primary Examiner* — Zachary Kuhfuss
(74) *Attorney, Agent, or Firm* — Muncy, Geissler, Olds & Lowe, P.C.

(57) ABSTRACT

A sleeper for supporting rails within a section of track for rail vehicles is provided, wherein the sleeper has elongated reinforcing elements extending along a longitudinal axis of the sleeper and is produced as a solid material sleeper having a cavity which extends between the reinforcing elements and from at least one outer face of the sleeper into the interior of the sleeper, and wherein the sleeper is designed for use with at least two different measurement value pick-up systems, wherein one of the measurement value pick-up systems is a temperature measurement value pick-up system having an infrared sensor which is accommodated by insertion into the cavity.

20 Claims, 2 Drawing Sheets

SLEEPER FOR SUPPORTING RAILS

This nonprovisional application is a continuation of International Application No. PCT/EP2011/000876, which was filed on Feb. 23, 2011, and which claims priority to German Patent Application No. DE 10 2010 009 754.3, which was filed in Germany on Mar. 1, 2010, and which are both herein incorporated by reference.

BACKGROUND OF THE INVENTION

1. Field of the Invention

The present invention relates to a sleeper for supporting rails within a section of track for rail vehicles, the sleeper having longitudinal reinforcing elements which extend along the longitudinal axis of the sleeper.

2. Description of the Background Art

Methods are known for adapting sections of track, i.e., sections of railway track comprising consecutive sleepers to which two parallel steel rails for rail vehicles are attached, to form measuring sections by replacing some of these conventional sleepers with special measuring sleepers and accommodating measuring devices therein, such as force or temperature measuring sensors, in order to use them with a measured value pickup system comprising a measuring device of this type for the purpose of determining physical variables when railbound vehicles pass over them. Such conventional sleepers to be replaced may be various and, in particular, wooden, steel and concrete sleepers, depending on their age, track construction and provided use by rail vehicles.

Methods are furthermore known, for example from DE 103 05 470, for disposing measuring devices of different measured value pickup systems, in particular measuring devices for force measurement, temperature measurement and/or path measurement, on common sleepers. Measuring devices for force absorption are therefore disposed between the rail and the sleeper so that, as a result, measuring devices of different measured value pickup systems may, in principle, be advantageously provided on conventional sleepers or also on conventional rails within a common section of track.

With regard to concrete sleepers for supporting railway rails, a concrete sleeper of this type is known from DE 100 30 998, which has approximately uniformly distributed reinforcing bars in the longitudinal direction of the sleepers which are cast into the concrete bodies under pretension, wherein a connecting plate which is fixedly anchored in the concrete body by reinforcing elements mounted on their undersides and which has fixing elements is provided on the upper face of the sleeper as a pickup element, wherein the connecting plate is mounted in an indentation in the area of the rail bearing in such a way that the surface of the connecting plate lies beneath the upper face of the sleeper, and wherein the fixing elements is designed in such a way that different measuring devices may be mounted thereon beneath the rails for measuring signal detection. A configuration of this type is suitable for force pickup systems, since the sensors used for this purpose are located directly in the rail-to-sleeper flow of force. With regard to temperature pickup systems which are used in the area of bogie monitoring, e.g., for hot box detection or stuck brake detection, the IT sensor used (infrared sensor) is, in part, highly susceptible to errors because of the extreme environmental conditions (weather, dynamic load, dirt). A disposal on the top of the sleeper, for example, is therefore of only limited suitability.

To dispose devices of temperature pickup systems, a special hollow sleeper is therefore ordinarily used as the measuring sleeper. However, these sleepers are substantially more susceptible to vibration, and the entire IT sensor system must therefore be held within the hollow sleeper using vibration dampening elements. The transverse displacement resistance of such special measuring or hollow sleepers is also only moderate with regard to conventional sleepers, in particular compared to concrete sleepers. With regard to such special hollow sleepers as measuring sleepers, reference may be made, for example, to DE 100 60 380 and EP 1 772 342.

A disposal of devices of a temperature pickup system within a hollow track sleeper, which is situated parallel to the conventional sleepers, is furthermore described in DE 42 17 681, which corresponds to U.S. Pat. No. 5,397,900. However, the disposal is such that the hollow track sleeper must be completely removed from the track in order to reach the IR sensor situated within the hollow track sleeper in the event of maintenance or if an error or failure of a temperature pickup system occurs.

SUMMARY OF THE INVENTION

It is therefore an object of the present invention to provide a sleeper for supporting rails within a section of track for rail vehicles, which accommodates measuring devices for different measured value pickup systems, has a high position stability and preferably maintains homogeneous rigidity ratios in track sections, is preferably easy to manufacture and thus cost-effective and suitably offers maintenance-friendly access to temperature measuring devices accommodated by the sleeper.

The invention therefore proposes a sleeper for supporting rails within a section of track for rail vehicles, wherein the sleeper has elongated reinforcing elements extending along the longitudinal axis of the sleeper and is produced as a solid material sleeper having a cavity which extends between these reinforcing elements and from at least one outer face of the sleeper into the interior of the sleeper, and wherein the sleeper is designed for use with at least two different measured value pickup systems, wherein one of the measured value pickup systems is a temperature measured value pickup systems having an infrared sensor which is accommodated by insertion into the cavity.

Essential advantages are thus seen in the fact that the sleeper may be used simultaneously for different measure value pickup systems, has a high position stability due to the fact that it is produced as a solid material sleeper and maintains, in principle, homogeneous rigidity conditions in sections of track as a result of the reinforcing elements. The integration of a cavity into a sleeper which is otherwise designed as a solid material sleeper is furthermore simple and economical. If the sleeper according to the invention is produced as a concrete sleeper into which the reinforcing elements are cast under pretension during the manufacture thereof; a high transverse displacement resistance and a continuous, stable positioning is achieved, built into a section of track. A sleeper of this type may also be cast, for example, into a concrete track foundation.

The cavity suitably extends along the longitudinal axis of the sleeper, in particular coaxially to the sleeper having reinforcing elements distributed largely uniformly around the cavity, enabling maintenance-free access to the IR sensors accommodated by the sleeper, since rails situated, in particular, on the upper face of the sleeper are unable to have an interfering influence.

It is advantageous if the cavity is designed in the shape of a pot instead of creating a passage between two outer faces of the sleeper, since this means that less material needs to be removed to form the cavity. When orienting the cavity along the longitudinal axis of the sleeper, for example, two cavities extending in opposite directions, between which material may remain, may also be provided.

The sleeper suitably includes a fixing component for coded position fixing of the IR sensor, thereby ensuring particularly easy assembly with a predefined end position.

For the easiest possible maintenance handling, it is furthermore provided that the fixing component is repeatedly detachable for the purpose of removing the IR sensor, e.g., in the manner of latching component or as a component for producing a bayonet closure.

To mount and remove the infrared sensor as safely as possible, the sensor can be disposed in a fixed position within a sheathing unit which is subsequently inserted into the cavity.

An embodiment provides that a base plate, which has first the fixing component accessible at least from the outer face of the sleeper when the sheathing unit has been removed from the cavity, is fixed around the cavity on the outer face of the sleeper, from which the cavity extends, and wherein the sheathing unit includes second fixing component of a complementary design, wherein the first and second fixing components interact to form a repeatedly detachable, coded position fixing system.

In particular, when orienting the cavity largely along the longitudinal axis of the sleeper, at least one channel extends into the cavity suitably at right angles to the longitudinal axis of the sleeper and coming from the upper face of a sleeper built into the section of track, in particular for temperature detection on axles, bearings, wheels, brakes and/or sleepers of rail vehicles, so that IR beams may easily reach the IT sensor from the rail vehicle parts to be monitored.

To protect against the effects of weather, a closing device which covers the channel toward the outside is suitably fixed to the upper face of the sleeper from which the channel extends, it being possible to open the closing device with the aid of a closing electronic device connected thereto in order to permit entry of IR beams for measurement purposes.

To facilitate maintenance, the closing device can be fixed in such a way that it may be repeatedly removed.

An embodiment provides that a base plate is fixed around the channel on the outer face of the sleeper, from which the channel extends, by means of a third fixing component, which are accessible from the outer face of the sleeper at least when the closing unit is removed from the cavity, and wherein the closing unit comprises fourth fixing component of a complementary design, wherein the third and fourth fixing component interact to form a repeatedly detachable, coded position fixing system.

In a practical embodiment, the sheathing unit, together with the IR sensor, is a mirror system which interacts with the IR sensor to deflect incident IR beams passing through the channel, the closing unit, in turn, being aligned with this mirror system.

It is furthermore provided to provide a force measured value pickup system having a force measuring cell as a second measured value pickup system, the force measuring cell being accommodated on an outer face of the sleeper and beneath the rail.

For this purpose, a indentation is created in the outer face of the sleeper to accommodate the force measuring cell and into which the force measuring cell is inserted, so that the rail position corresponds to the rail disposed on the additional conventional sleepers.

To facilitate assembly, the force measuring cell may rest on a base plate which is fixedly connected to the sleeper. In addition, an intermediate plate may be furthermore disposed between the force measuring cell and the rail. This intermediate plate makes it possible to use force measuring cells of a wide range of designs as well as vastly different rail types and also provides protection from above.

An adapter plate may be furthermore disposed between the intermediate plate and the rail, or the intermediate plate itself may be designed as an adapter plate onto which the rail may be immovably clamped at a specified inclination.

In a manner which is known per se, the force measuring cell may have electric connections for tapping electric signals which represent the force introduced into the force measuring cell from the rail.

One particular embodiment provides for the fact that the force measuring cell is constructed to pick up vertical forces (Q) and horizontal forces (Y).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
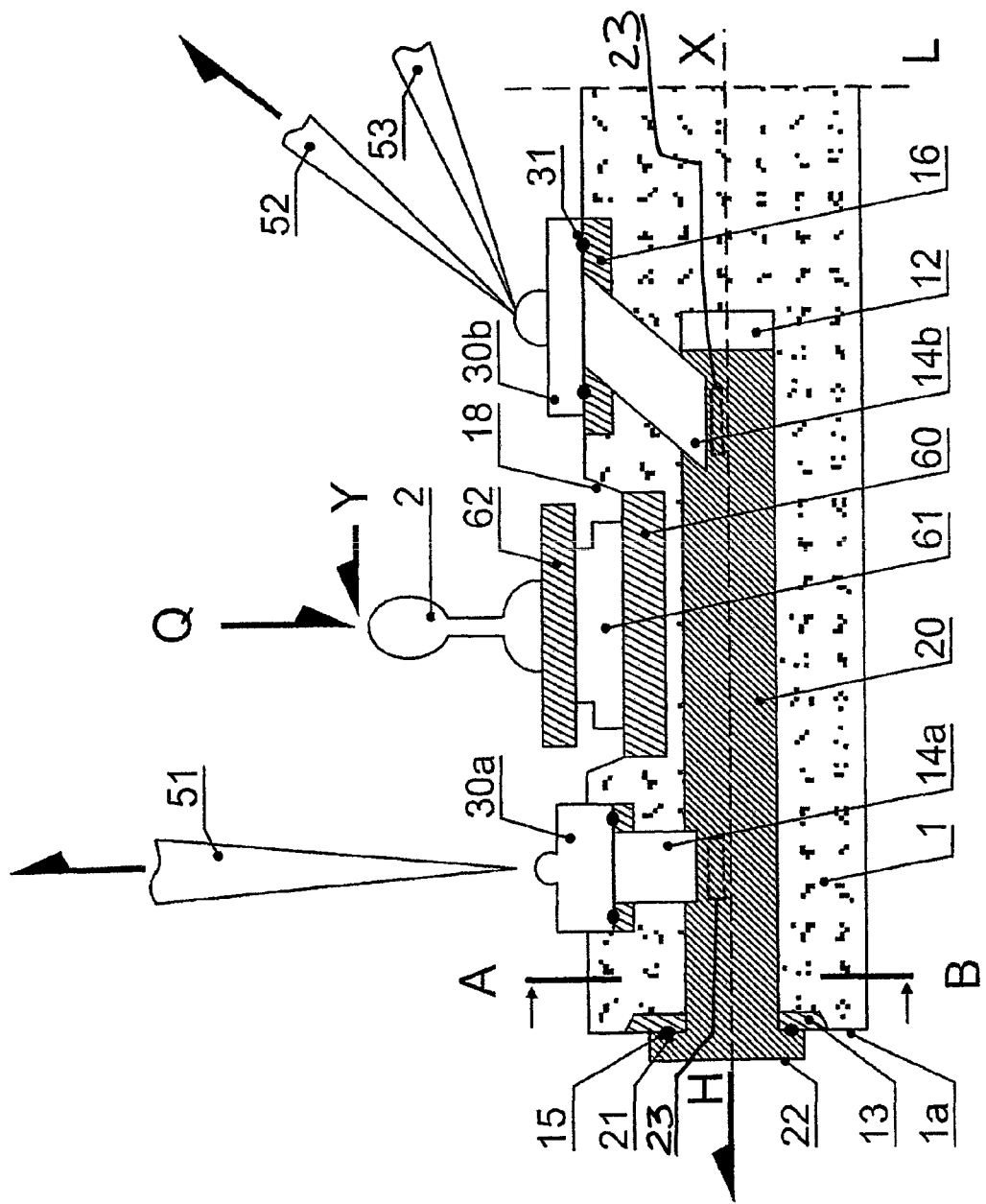
FIG. 1 shows a section of a partially cut-away view of a longitudinal section of a sleeper according to the invention, which is produced as a concrete sleeper.

FIG. 1 shows a partially cut-away view of a longitudinal section of a sleeper 1 for supporting rails 2 designed according to the invention.

Sleeper 1 for supporting rails for rail vehicles is produced as a solid material sleeper and has elongated reinforcing elements 11 extending along longitudinal axis X of the sleeper, wherein a cavity 12 extending between these reinforcing elements 11 is provided within the concrete sleeper. The sleeper is designed for use with at least two different measured value pickup systems, wherein one of these measured value pickup systems is a temperature measuring measured value pickup system having at least one IR sensor which is not shown in greater detail in the figures in the interest of clarity and which is accommodated within cavity 12. Sleeper 1 can be produced as a concrete sleeper, and the reinforcing elements 11 are cast into this concrete sleeper under pretension during the manufacture thereof.

A force measured value pickup system having a force measuring cell 61 is shown as the second measured value pickup system, wherein the force measuring cell is accommodated on an outer face of the sleeper and beneath rail 2.

The infrared sensor may be accommodated by insertion into the cavity, as described in greater detail below.

Figure 2:
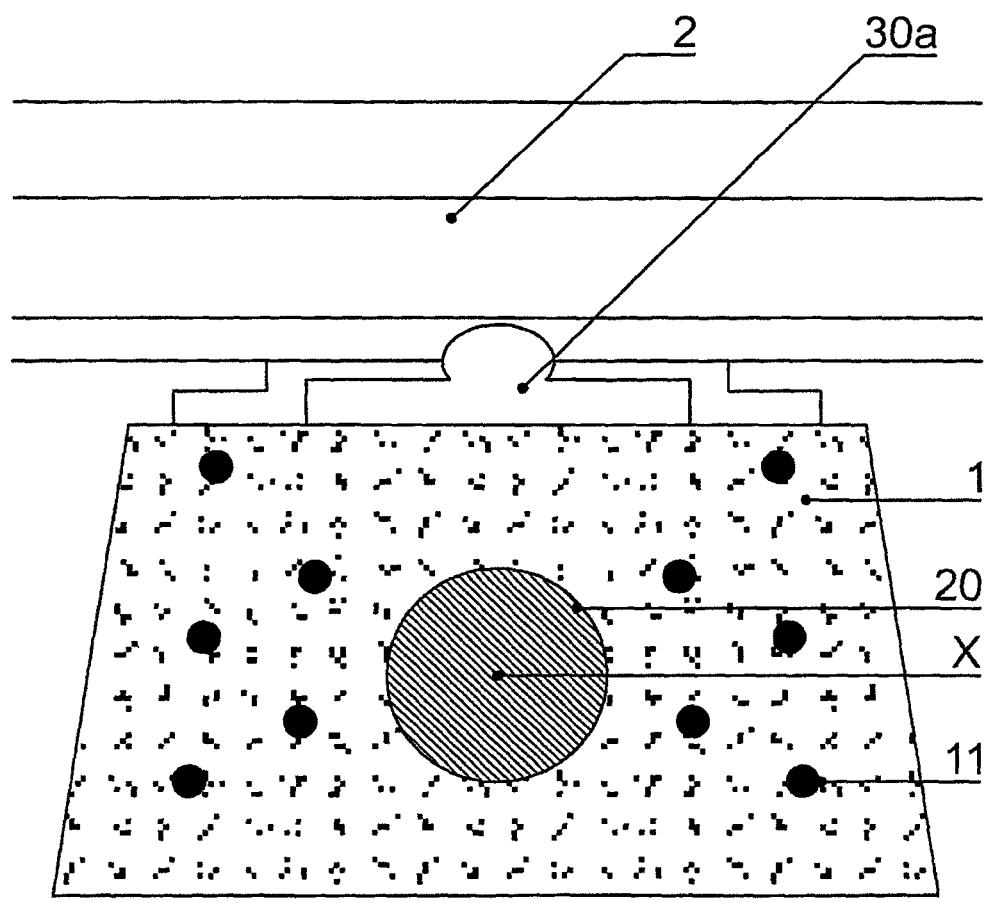
FIG. 2 shows a section along line AB in FIG. 1, viewed from the left according to FIG. 1.

Specifically, illustrated cavity 12 extends along longitudinal axis X of the sleeper, coaxially to the sleeper, according to the exemplary embodiment. The reinforcing elements may thus extend around cavity 12 in a largely uniform distribution, as illustrated, in particular, in FIG. 2.

As shown by the dotdashed line L in FIG. 1, FIG. 1 shows only a portion of a concrete sleeper 1, which therefore extends toward the right side according to FIG. 1 and supports a second rail which runs parallel to first rail 2.

According to the exemplary embodiment, cavity 12 is designed in the shape of a pot so that another cavity extending in the opposite direction from cavity 12 is suitably disposed in the sleeper area extending to the right side, which is not illustrated. For reasons of clarity, however, reference is made below only to the illustrated section, since the sleeper area extending to the right side may have a largely mirror-image construction.

Pot-shaped recess 12 is situated beneath rail 2, integrated during the process of producing concrete sleeper 1, and extends coaxially to longitudinal axis X of concrete sleeper 1, an opening being provided on a transverse side 1a of the concrete sleeper, through which the IR sensor may be inserted into the cavity and from which it may also be removed again.

For coded position fixing of the IR sensor, i.e., for assembly using a predefined end position, the sleeper has a fixing component 15 which can also be repeatedly detachable so that the IR sensor may be, in principle, removed again at any time, in particular for maintenance purposes. The fixing component which ensures coded position fixing and is also repeatedly detachable may be designed, for example, as a latch or as a component for producing a bayonet closure.

To further protect the IR sensor, the sensor is suitably first disposed in a fixed position in a sheathing unit 20, and this sheathing unit 20 is then inserted, as shown in the figures, into cavity 12, which may have, for example, a cylindrical design, in the direction of arrow "H", according to FIG. 1. To fix the sensor in an immobile, fixed position, it is provided according to FIG. 1 that a base plate 13, which has first fixing component 15, e.g., in the form of latching recesses, is fixed around cavity 12 on the outer face of the sleeper, from which cavity 12 extends. The fixing component 15 is thus accessible from the outer face of the sleeper at least when sheathing unit 20 is removed from the cavity and thus when the IR sensor has been removed. Sheathing unit 20 has a second fixing component 21 of a complementary design, e.g., in the form of latching tabs, so that first and second fixing components 15 and 21 interact for the purpose of repeatedly detachable, coded position fixing.

It is apparent to those skilled in the art that such or similar fixing components are suitably also provided for disposing the IR sensor within sheathing unit 20.

In any case, fixing components 21 and 15 thus produce an immobile, predefined positioning of sheathing unit 20 in a fixed position within cavity 12, so that an optimum interaction between the IR sensor and additional components of a temperature measuring measured value pickup system, which may also be disposed outside sheathing unit 20, is ensured, as described below.

A temperature measuring measured value pickup system of this type usually includes at least one infrared measuring head, by means of which the temperature of a body may be detected contactlessly over greater distances and which is disposed within sheathing unit 20. An infrared measuring head of this type, as is known per se to those skilled in the art, may have a plurality of sensors which are used to determine an extensive measuring area of the infrared measuring head. Each sensor measures the infrared radiation of certain wavelengths in a separate sector, for example in sector 51, sector 52 or sector 53. According to FIG. 1, sector 51 is designed, for example, in such a way that, when a rail vehicle passes by, it is oriented to the bearings or axles of the wheels traveling on rail 2, and sectors 52 and 53 are oriented in such a way that they are directed, for example, onto the brakes or onto the wheels of a passing train whose wheels are rolling on a rail parallel to rail 2.

As illustrated in FIG. 1, multiple sectors are provided in order to thus detect multiple measuring points on a train. In this case, an IR sensor which has multiple infrared heads or also multiple IR sensor units, each having an infrared head, may be provided within sheeting unit 20, the measuring heads largely having an identical structure and also being able to work together with the same peripheral equipment. In the illustrated example, a mirror 23, which is also disposed in sheathing unit 20 and by means of which the infrared radiation incident upon a sector is deflected to the infrared measuring head, is assigned to each measuring head of this one IR sensor. Each mirror 23 can be provided with a motor (not illustrated), which is also disposed within infrared sensor unit 20 for the purpose of rotating the mirror 23 on the mirror plane, so that dirt located on the surface of the mirror may be spun off, and for the purpose of maintaining a reflection direction which is defined more precisely on a time average by averaging out mirror alignment errors, since uneven areas on the mirror surface may be averaged out by rotating a mirror of this type. A data preprocessing unit, which is connected to the measuring heads via measuring data lines and which is used to ultimately process the received radiation into heat ascertainment data, can also be disposed within sheathing unit 20. To transmit the processed data to the outside, lines may be run from sheathing unit 20 to the outside, or the processed data may also be transmitted with the aid of radio waves. Depending on the specific embodiment, corresponding components are disposed within sheathing unit 20 and connected.

It should be noted that the measuring heads may also, in principle, be oriented directly onto bogie sections of passing rail vehicles, so that mirrors for deflection purposes may be omitted.

Channels 14a, 14b, which extend into cavity 12, are introduced into concrete sleeper 1 during the manufacture thereof for the incidence of IR radiation. As shown in FIG. 1, these channels 14a, 14b extend perpendicularly to the longitudinal axis of sleeper 1 and from the upper face thereof into cavity 12 if the sleeper is built into the section of track.

Each channel 14a or 14b can be closed to the outside by closing unit 30a or 30b which is fixed to the upper face of the sleeper, it being possible to close and open closing unit 30a or 30b by means of an electronic closing device, e.g., a motor or an electromagnet, which is connected thereto but not illustrated. When the closing device is closed, dirt may therefore not enter the interior of the concrete sleeper and, in particular, a mirror system interacting with the IR sensor and aligned with the closing unit is not contaminated if sheathing unit 20 is correctly fixed within cavity 12, as described above. The opening and closing of the closing devices induced with the aid of the electronic closing device enable the channels to be covered or closed between individual measuring phases. A control line can be provided for each closing unit, which leads to the data preprocessing device disposed, for example, within sheathing unit 20, so that this control line also handles the control of the closing units, which control may also include not only opening and closing the closing unit but also measuring the temperature in the vicinity of the closing unit, heating the closing unit at an ambient temperature below a predefined threshold value and/or detecting the positions of the closing units with the aid of position sensors such as limit switches. Heating elements (not illustrated) may furthermore be provided via which the closing units may be heated during winter, thereby preventing the mechanical components from freezing.

For maintenance reasons, closing devices 30a, 30b are suitably fixed in such a way that they may be repeatedly removed. A fixing mechanism 31 and 16, which resembles fixing components 15 and 21, is provided for each of the closing units so that the closing units may be very easily removed from concrete sleeper 1 in a largely vertical direction. According to FIG. 1, the fixing mechanism illustrated by way of example therein includes a base plate 16 which is disposed around relevant channel 14a, 14b and includes recesses with which latching tabs 31 situated on closing unit 30a or 30b may engage in a fixed and accurate position in the vertical direction. Fixing component 16 is therefore accessible from the upper face of the sleeper at least when closing unit 30a, 30b is removed. Base plate 16, which is displayed with fixing component 16 and includes recesses, may furthermore be introduced into concrete sleeper 1 in a previously created recess, so that any projection extending beyond the dimensions of concrete sleeper 1 is suitably reduced to a minimum, and the components of the temperature measured value pickup system which are integrated into the concrete sleeper are thus largely unsusceptible to any environmental influences.

To accommodate force measuring cell 61 of the second measured value pickup system illustrated in FIG. 1, a indentation 18 is created beneath rail 2 in concrete sleeper 1 during the manufacture thereof, into which force measuring cell 61 is inserted. In the present case, a base plate 60 is first introduced into recess 18 and fixedly connected to concrete sleeper 1, for example by means of reinforcing elements as described in DE 100 30 998. Force measuring cell 61 then rests on the base plate, and an intermediate plate 62, on which rail 2, in turn, rests, may be disposed between rail 2 and force measuring cell 61. As described, for example, in DE 10 2006 015 924, an adapter plate may also be disposed between the intermediate plate and rail 2, or the intermediate plate itself may be designed as an adapter plate, so that rail 2 is immovably fixed, e.g., clamped, at a predefined inclination on the adapter plate.

Force measuring cell 61 has electric connections (not illustrated) at which signals representing the force introduced into the force measuring cell from the rail may be tapped in a manner which is not shown. The force measuring cell itself can be constructed in a suitable manner for picking up vertical forces "Q" and horizontal forces "Y." A structure of this types may be implemented, for example according to methods described in DE 10 2008 018 076.

The measuring system comprising at least two different measured value pickup systems, in the present case at least one force measured value pickup system and at least one temperature measured value pickup system, which is described on the basis of the exemplary embodiment and integrated into a solid material sleeper 1, is thus characterized by a much better quality compared to steel sleepers having integrated measuring systems, in particular with regard to position stability, rigidity and resistance to movement. Due to the manufacturing, the integration is also more favorable than in connection with steel sleepers. The rigidity ratios of the concrete sleeper in a section of track, which are highly homogeneous despite the integration of the measuring system, characterize a concrete sleeper of this type with a high suitability of a concrete sleeper as a support for producible measuring technology. In addition, attention may always be paid to the structural conditions of the reinforced concrete sleeper if the measuring system is integrated. Finally, fast access, in particular, to the closing units of temperature measured value pickup systems, such as hot box, hot brake or hot bearing detection system, may be ensured. The maintenance of the IR sensor of heat transducer systems of this type, including system-related mirrors, is easily ensured according to the invention, due to its integration within the cavity within the concrete sleeper. The closing units may suitably be easily detached and removed vertically from the solid material sleeper, while the IR sensor may be easily detached and removed largely horizontally therefrom. Since the IR sensor is located within the sleeper reinforcing element, it may be disposed within the sleeper in the conventional manner, so that the stability and rigidity of such a solid material sleeper designed according to the invention continues to meet the quality requirements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sleeper for supporting rails within a section of a track for rail vehicles, the sleeper comprising:
   at least one outer face; and
   elongated reinforcing elements extending along a longitudinal axis of the sleeper and formed as a solid material sleeper having a cavity that extends between the reinforcing elements and from the at least one outer face of the sleeper into an interior of the sleeper,
   wherein the sleeper is configured for use with at least two different measured value pickup systems,
   wherein one of the measured value pickup systems is a temperature measured value pickup system having an infrared sensor which is accommodated by insertion into the cavity, and
   wherein the infrared sensor is disposed in a fixed position within a sheathing unit,
   the sleeper further comprising a base plate, which has a first fixing component accessible from the outer face of the sleeper at least when the sheathing unit has been removed from the cavity, is fixed around the cavity on the outer face of the sleeper, from which the cavity extends, wherein the sheathing unit includes a second fixing component, and wherein the first and second fixing components interact to form a repeatedly detachable, position fixing system,
   wherein a portion of the sheathing unit extends out of the cavity to an outside of the sleeper, the portion of the sheathing unit that extends outside of the sleeper containing the second fixing component.

2. The sleeper according to claim 1, wherein the sleeper is produced as a concrete sleeper and into which the reinforcing elements are cast under pretention during the manufacture thereof.

3. The sleeper according to claim 1, wherein the cavity extends along the longitudinal axis of the sleeper or wherein the cavity extends coaxially to the sleeper having reinforcing elements that are distributed substantially uniformly around the cavity.

4. The sleeper according to claim 1, wherein the cavity is formed in the shape of a pot.

5. The sleeper according to claim 1, wherein the sleeper is designed with a fixing component for position fixing of the infrared sensor.

6. The sleeper according to claim 1, wherein a fixing component is repeatedly detachable for the purpose of removing the infrared sensor.

7. The sleeper according to claim 1, wherein at least one channel, which is situated transversely to the longitudinal axis of the sleeper and comes from an upper face of the sleeper when the sleeper is built into the section of track, extends into the cavity.

8. The sleeper according to claim 7, further comprising a closing unit configured to cover the at least one channel to an outside and which is configured to be opened by a closing electronic device connectable thereto, the closing unit being fixed to the upper face of the sleeper from which the at least one channel extends.

9. The sleeper according to claim 8, wherein the closing unit is fixed in a repeatedly removable manner.

10. The sleeper according to claim 8, wherein a base plate, which has a third fixing component accessible from the outer face of the sleeper at least when the closing unit is removed, is fixed around the channel on the outer face of the sleeper, from which the channel extends, wherein the closing unit includes a fourth fixing component, and wherein the third and fourth fixing components interact to form a repeatedly detachable, position fixing system.

11. The sleeper according to claim 10, wherein a mirror system which interacts with the infrared sensor for deflecting incident infrared beams passing through the channel is disposed in the sheathing unit and is aligned with the closing unit.

12. The sleeper according to claim 1, wherein a second measured value pickup system is a force measured value pickup system having a force measuring cell, which is accommodated on an outer face of the sleeper and beneath the rail.

13. The sleeper according to claim 12, wherein an indentation is created in the outer face of the sleeper for accommodating the force measuring cell and into which the force measuring cell is inserted.

14. The sleeper according to claim 12, wherein the force measuring cell rests on a base plate that is fixedly connected to the sleeper.

15. The sleeper according to claim 12, wherein an intermediate plate is disposed between the force measuring cell and the rail.

16. The sleeper according to claim 15, wherein an adapter plate is disposed between the intermediate plate and the rail or wherein the intermediate plate is configured as an adapter plate onto which the rail is immovably clamped at a prescribed inclination.

17. The sleeper according to claim 12, wherein the force measuring cell has electric connections for tapping electric signals which represent the force introduced into the force measuring cell from the rail.

18. The sleeper according to claim 12, wherein the force measuring cell is configured to pick up vertical forces and horizontal forces.

19. The sleeper according to claim 1, wherein the first fixing component is provided on an exterior surface of the base plate that faces away from the sleeper.

20. A sleeper for supporting rails within a section of a track for rail vehicles, the sleeper comprising:
    elongated reinforcing elements extending along a longitudinal axis of the sleeper;
    a cavity that extends between the reinforcing elements and along the longitudinal axis of the sleeper; and
    a measured value pickup system that is accommodated within the cavity,
    wherein the measured value pickup system is disposed in a fixed position within a sheathing unit,
    the sleeper further comprising a base plate, which has a first fixing component accessible from an outer face of the sleeper at least when the sheathing unit has been removed from the cavity, is fixed around the cavity on the outer face of the sleeper, from which the cavity extends, wherein the sheathing unit includes a second fixing component, and wherein the first and second fixing components interact to form a repeatedly detachable, position fixing system,
    wherein a portion of the sheathing unit extends out of the cavity to an outside of the sleeper, the portion of the sheathing unit that extends outside of the sleeper containing the second fixing component.

* * * * *